Figure 1:
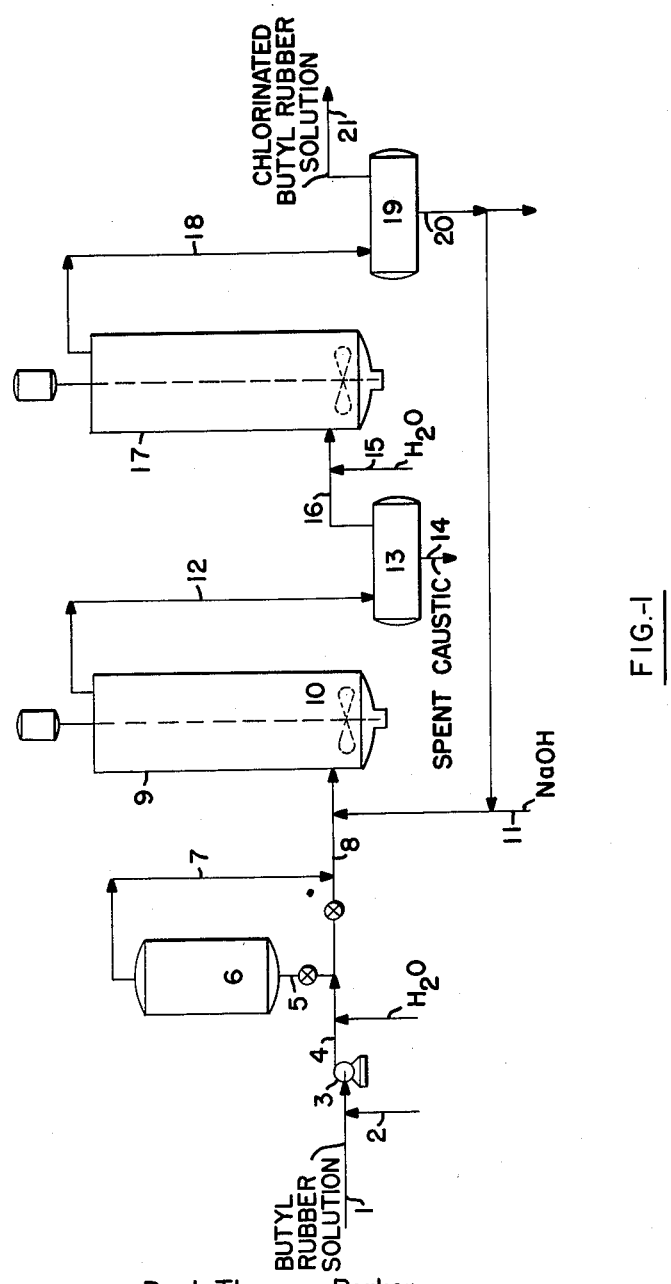

United States Patent Office 3,099,644
Patented July 30, 1963

3,099,644
CONTINUOUS CHLORINATION AND BROMINATION OF BUTYL RUBBER
Paul Thomas Parker, Baton Rouge, La., John L. Bryan, Jr., Summit, and Augustus B. Small, Westfield, N.J., and Duane Wood Pugh and Fred J. Buchmann, Baton Rouge, La., assignors to Esso Research and Engineering Company, a corporation of Delaware
Filed Oct. 6, 1959, Ser. No. 844,715
7 Claims. (Cl. 260—85.3)

This invention relates to the chlorination and bromination of low unsaturation isoolefin polymers and more particularly relates to a continuous process for introducing chlorine or bromine into the unsaturated double bonds of a copolymer of a major proportion of an isoolefin and a minor proportion of a diolefin.

The copolymers useful in the present invention contain a major proportion, preferably at least 70 wt. percent, of isoolefins and a minor proportion, preferably not more than about 30 wt. percent, of multiolefins. Copolymers of this general type, especially where the copolymer contains about 85–99.5% (preferably 95–99.5%) of a $C_4$–$C_7$ isoolefin, such as isobutylene, with about 15–0.5% (preferably about 5–0.5 wt. percent) of a multiolefin of about 4–14 carbon atoms, are commonly referred to in patents and literature as "butyl rubber"; see, for example, the textbook "Synthetic Rubber" by G. S. Whitby (1954 edition by John Wiley and Sons, Inc.), pages 608–609, etc. The expression "butyl rubber" as employed in the specification and claims is intended to include copolymers containing about 80–99% by weight of an isoolefin of about 4–7 carbon atoms and about 10–1% of a conjugated multiolefin of about 4–10 carbon atoms. The preparation of butyl-type rubbers is amply described in the literature. In general, it consists of the reaction product of a $C_4$–$C_7$ isoolefin (preferably isobutylene) with a $C_4$–$C_{10}$ (preferably a $C_4$–$C_6$) conjugated diolefin, such as isoprene, butadiene, dimethyl butadiene, piperylene, etc. The reaction product of isobutylene and isoprene is preferred.

Although attempts have been made in the prior art to chlorinate and brominate butyl rubber, these have all been batch processes. The present invention presents a simple, commercially feasible continuous process for the chlorination or bromination of butyl rubber in which a solution of butyl rubber is continuously contacted with chlorine or bromine for a short period of time with or without the use of a time tank. The halogenated product solution is then continuously washed by contacting it with water or dilute caustic and subsequently separating the washed solution from the wash liquid. One or more washing stages, each washing stage consisting of a liquid-liquid contacting device and a liquid-liquid separating device, is employed; the number used being determined by the degree of neutralization desired. It is within the scope of this invention to combine neutralization and liquid-liquid separation in a single vessel.

The invention will be described with reference to the accompanying drawing which is a diagrammatic representation of one embodiment of the invention.

Referring now to FIG. 1 of the drawing, the process will be described in connection with chlorination. A solution of butyl rubber is introduced through line 1. The polymer is dissolved in any suitable solvent. These include carbon tetrachloride, chloroform, nonolefinic hydrocarbons having three to twelve carbon atoms, preferably four to eight carbon atoms, such as cyclohexane, cyclopentane, butane, isobutane, n-pentane, isopentane, neopentane, n-hexane, isohexane, 3-methylpentane, neohexane, diisopropyl, n-heptane, or even aromatic hydrocarbons such as benzene or toluene, or mixtures of any of these. n-Hexane is the preferred solvent.

The concentration of the polymer in the solvent will depend upon the type of reactor, molecular weight of the polymer, etc. In general, the concentration of a butyl rubber having a viscosity average molecule weight of about 200,000 to about 2,000,000, if the solvent is an inert hydrocarbon such as n-hexane, will be between 1 and 30% by weight, preferably 5 to 20%. The solution of butyl rubber is mixed with chlorine gas introduced through line 2. The chlorine gas may also be diluted with up to about 5 times its volume, preferably 0.1 to 2.0 times its volume, of an inert gas such as nitrogen, carbon dioxide, etc. The mixture is passed to pump 3 which may be a small centrifugal pump, such as an open-impeller centrifugal pump such as the Worthington. Another suitable pump is a centrifugal pump made of east alumina manufactured by the General Ceramics Corp. Instead of a centrifugal pump, other types of mixers or contactors may be used such as a Marine impeller in a tank and commercial contactors such as the Stratco contactor. Thus, the type of mixer is not critical. However, the amount of chlorine added to the rubber is critical. Preferably, it should not exceed one atom of chlorine per double bond in the polymer. Larger amounts can be added by lengthening contacting time or by increasing chlorine dosage, but degradation of the polymer occurs due to the breaking of the carbon to carbon linkage. Stated differently, the maximum mol percent of combined chlorine should be about 0.25–1.0 times the mol percent of unsaturation of the polymer.

The chlorination is advantageously conducted at 0° to 100° C., preferably at about 20° to 80° C. Contact time is of the order of 5 seconds to 25 minutes or more. In most cases the chlorinated polymer and evolved hydrogen chloride are immediately contacted with a dilute solution of caustic to neutralize the hydrogen chloride. However, if a longer residence time than that obtained in the line is desired, the chlorinated polymer is passed by lines 4 and 5 to time tank 6. After a short residence time (2–25 minutes) in the tank, it is passed by lines 7 and 8 to agitator 9. High chlorine content with low contact time can be secured only by increasing the concentration of the chlorine. However, when this is done, the chlorine is more difficult to neutralize and, despite the use of theoretical amounts of caustic, free chlorine and sodium hypochlorites are incorporated in the polymer. When such polymers are extruded and dried at 300° F. or higher, molecular breakdown occurs. The excess chlorine and hypochlorites may be removed by adjusting the pH of the polymer slurry during finishing as described and claimed in Serial No. 659,465 to Werner A. Bauch et al., now U.S. Patent No. 2,973,346, issued February 28, 1961, so that temperatures as high as 375° F. may be used during drying. However, such technique unnecessarily increases the metallic ion content in the finished polymer. This can be avoided by contacting the polymer with chlorine for at least 25 minutes in time tank 6. Accordingly, it is one feature of this invention to improve the quality of the halogenated polymer and improve the operability of the process by the use of time tank 6 in which the polymer is maintained in contact with the chlorine for at least 25 minutes. It has been determined that the type of agitation and the ratio of halogenated polymer solution to wash liquid critically affect the degree of neutralization and ease of separation. The important considerations for this equipment are: (1) to obtain a satisfactory degree of neutralization of the hydrogen halide formed as a by-product of the halogenation reaction; and (2) to obtain adequate separation of the halogenated polymer solution and the wash liquid in the liquid-liquid separation vessel into which the effluent from the agitator is introduced. Two types of agitation have been found to be suitable for neutralization of the reaction product. The first system consists of an agitator in an unbaffled mixing vessel operated under conditions that promote the repeated dispersion of the polymer solution into the wash liquid followed by coalescence of the dispersed droplets of halogenated polymer solution. The high viscosity of the halogenated polymer solution decreases internal turbulence of the dispersed chlorinated polymer solution droplets, and thus slows the passage of dissolved hydrogen halide to the droplet-wash liquid interface. Consequently, when the droplets become depleted of hydrogen halide at the chlorinated polymer solution wash liquid interface, the rate of neutralization becomes slow and is limited by the rate of diffusion of hydrogen halide to the interface. When the droplets are coalesced and subsequently redispersed by the agitating device, the new droplets have a higher hydrogen halide concentration at the interface, and are consequently neutralized at a higher rate than before coalescence. The repeated dispersion and coalescence of the chlorinated polymer solution provides satisfactory neutralization with very low power consumption. A second type of agitation found to be suitable for neutralizing the halogenated polymer solution employs mixing devices commonly employed to produce emulsions of extremely small droplets of a liquid dispersed in a second liquid. Two devices of this type which gave satisfactory neutralization results were the Stratco contactor manufactured by the Stratford Engineering Corporation of Kansas City, Missouri, and the dispersator mixer manufactured by Premier Mills of Geneva, New York. These mixing devices sub-divided the polymer solution and the droplets sufficiently small that the dissolved hydrogen halide was readily extracted. Agitation in mixing devices common in the art, such as flat-bladed turbines operating in a baffled mixing vessel of a height that is between 2 and 3 times the vessel diameter, gives neutralization results definitely inferior to either of the arrangements described above that provided satisfactory neutralization.

A dilute solution of caustic or other hydroxide or carbonate of an alkali metal or ammonium hydroxide is added through line 11 to the chlorinated polymer flowing in line 8. It is important to obtain as rapid and intimate contact between the chlorinated polymer solution and the dilute alkali and water in agitator 9 and in the subsequent agitator 17 as possible. If the mixing is inefficient, the polymer solution will not be washed in a reasonably short contact time. While poor mixing, excessive contact time will be required which call for excessively large and expensive washing equipment. Furthermore, rapid and as complete settling of the water from the cement is necessary to minimize the alkali in the polymer and to keep the size of the settling vessels within commercially feasible limits.

In the preparation of butyl rubber, it is regular commercial practice to withdraw a slurry of polymer in methyl chloride diluent from the reactor and introduce it into a tank of warm water to flash off the methyl chloride and unreacted monomers. This water regularly contains a small amount of a polymer dispersing agent such as zinc stearate or calcium stearate or other metal soap to prevent the polymer particles from agglomerating and to keep them dispersed in the water. Much of this dispersing agent is picked up by the polymer so that butyl rubber solutions submitted to halogenation, unless specially treated, contain small amounts of these soaps. These soaps act as emulsifying agents when the polymer solution is treated with dilute alkali as described above, especially when subjected to the severe agitation required. This results in the washed polymer solution containing large amounts of occluded water which is extremely slow settling. With inadequate mixing of the cement and aqueous phases, insufficient removal of the HCl from the cement results. This is undesirable.

In accordance with one feature of this invention, the above difficulties can be overcome and both efficient mixing and adequate settling can be obtained when metal soaps are present in the polymer solution if the pH of the aqueous phase in agitators 9 and 17 is maintained at about 3 to 4 or 10 to 11. A high pH, however, unfavorably influences the quality of the final product. This can be corrected by adjustment of the pH to 6.5 to 7.5 as described in the aforementioned application Serial No. 659,465, now Patent No. 2,973,346, to Bauch et al. but this adjustment is an added waste of acid, consequently it is preferred to maintain a pH of 3–4 in the wash water. If the pH is above 4 and below 10, large amounts of water remain in the polymer solution phase.

The amount of water remaining in the cement is important because if too much water is present in the polymer solution, there will be excessive amounts of alkali metal remaining in the finished polymer. It will interfere with the water balance over the process, and to effectively remove this water by longer settling times will require excessively large settling drums.

The rate of settling of the water from the washed polymer solution in the operation of a commercial unit is of particular importance because of its relation to the size of the settling drums. With low rates, the size of the settling drums necessary to remove the major part of the water will be uneconomically excessive.

The amount and concentration of the alkali will depend upon the amount of hydrogen chloride liberated in the chlorination step. It should be sufficient to result in a neutralized product having a pH of about 3 to 4 as described above. It is essential that the contact between the caustic and hydrogen chloride present in the chlorinated butyl rubber solution be as thorough as possible in order to secure the desired neutralization. This will depend upon the type of mixing used. It may range from 7 seconds in a Stratco contactor to as much as 10 minutes in a Dispersator or mixer using a marine type impeller. After the desired residence time, the neutralized solution is passed to drum 13 where it is allowed to settle.

Spent caustic at a pH of about 3 to 4 is drawn off through line 14. From tank 13 the chlorinated polymer solution is contacted with water entering through line 15 and passed by line 16 into agitator 17. The amount of water added can vary from a ratio of 0.5 volume per volume of polymer solution to 5 volumes per volume of polymer solution, preferably 1 to 3 volumes per volume of polymer solution. Agitator 17 is the equivalent of agitator 9, and the agitation occurring must be as efficient as that in agitator 9 or complete washing will not be achieved. Washed polymer solution is passed by line 18 to drum 19 where it is again settled and water is drawn off through line 20 and recycled, if desired, to line 11 where it is used to dilute the incoming caustic to the desired strength. A washed chlorinated butyl rubber solution is removed through line 21 and is passed to storage or to other units suitable for recovering the solid chlorinated polymer.

This recovery system may be any type known to the art. For example, the polymer may be precipitated with the acetone or any other known non-solvent for the polymer and dried under about 1 to 760 millimeters or higher of mercury pressure absolute at a temperature between 0° and 180° C., preferably between 50° and 150° C. A suitable temperature is 70° C. Other methods of recovering the chlorinated butyl polymer from the hydrocarbon solution are conventional spray or drum drying techniques. A particularly effective method for recovering the chlorinated butyl rubber is to discharge the effluent from drum 19 through a nozzle with steam water into a vessel containing agitated water heated to a temperature sufficient to flash off the hydrocarbon solvent and any remaining hydrogen chloride, and form an aqueous slurry of the chlorinated butyl rubber. The chlorinated butyl rubber may then be separated by filtration, dried and recovered as a "crumb" or as a dense sheet or slab by conventional milling and/or extruding procedures.

The chlorinated butyl rubber prepared as described above is similar to ordinary butyl rubber as to rubbery characteristics and in general is useful for the same purposes as butyl rubber. It also has the property of being usable with zinc oxide and/or sulfur with or without added vulcanization accelerators such as thiuram polysulfides or other derivatives of thiocarbamic acids. The chlorinated polymer has in general a viscosity average molecular weight between about 200,000 and 2,000,000 and an iodine number between about 1.0 and 70, preferably between 3 and 35. After curing it has good elastic limit, tensile strength, abrasion resistance and flexure resistance. For vulcanization purposes it may be further compounded with various fillers such as clays, silica, or titanous dioxide as well as with plasticizers which are preferably hydrocarbon plasticizer oils.

The process described above for the continuous chlorination of butyl rubber is in general the same if bromine be substituted for the chlorine. However, there are a few critical differences. When bromine is used, the reaction is about 85 to 90% complete within 15 to 30 seconds and approaches completion in about one minute. Reaction is essentially entirely complete in about two to three minutes. By complete reaction is meant the addition of one atom of bromine per mole of unsaturation. When excess bromine is present, the bromine will continue to react with the rubber after the theoretical amount of bromine equivalent to the mole unsaturation has been consumed resulting in breakdown of the rubber. Only sufficient agitation to insure complete mixing of the bromine is required. After mixing, the reaction will proceed as rapidly as before with no further agitation. Thus, the bromine and solution of butyl rubber can be mixed in any short holding time device, and then allowed to go to completion in a holding vessel. The washing steps and pH control of the wash water are the same for bromination as described above for chlorination.

The invention will be better understood from the following examples:

EXAMPLE I

A butyl rubber having an unsaturation of about 2.0 mole percent was dissolved in hexane to give a cement having a polymer concentration of about 16%. This cement was introduced at a rate of 2.1 lbs. per minute through line 1 of a 0.2 ton per day pilot plant operating as described in the drawing. It was contacted with 1730 cc. of chlorine per minute as measured under standard conditions of temperature and pressure. The chlorine and cement were thoroughly mixed in a Worthington type 3/4—CGI centrifugal one-horse power pump operating at 1740 r.p.m. at a temperature of about 80° C. It was then passed to time tank 6 where it remained for 7.3 minutes under an agitator speed of 320 r.p.m. Following this, it was mixed with dilute caustic solution made up by mixing 10% caustic introduced through line 11 at a rate of 4.7 cc. per minute with 3 volumes of water per volume of cement recycled through line 20. This mixture was passed to tank 9 having an inside diameter of eight inches and a length of 40 inches. The tank contained no baffles and was provided with a three-bladed impeller having a diameter of 6 inches and a blade width of 2⅛ inches and a blade pitch of 1 inch and being mounted eight inches from the bottom of the tank. It was operated at a speed of 470 r.p.m. After a residence time of about seven minutes, the neutralized mixture was passed to drum 13 where it was allowed to settle for 13 minutes. Spent caustic having a pH of 2.8 was withdrawn through line 14. From drum 13 the neutralized cement was passed to agitator 17 together with 1.9 volumes of water per volume of cement. Agitator 17 was identical with agitator 9 but operated at an r.p.m. of 360.

The washed cement from tank 17 was drawn off to settler 19 and after a residence time of thirteen minutes water was withdrawn through line 20 to be recycled to line 11. The pH of this recycled water was 6.3. The settling obtained in both settlers 13 and 19 was good. In over-all operation of the unit, 3.58 wt. percent chlorine was added to the polymer and a chlorinated polymer containing 1.13 wt. percent chlorine was obtained. This represented a chlorine utilization of 32%.

After recovering the chlorinated rubber from the cement drawn off drum 19 through line 21, it was compounded according to the following recipe:

| | Parts by weight |
|---|---|
| Chlorinated butyl rubber | 100 |
| ZnO | 5 |
| Stearic acid | 1 |
| SRF carbon black | 50 |

This mixture was cured for 60 minutes at 307° F., and a finished vulcanized polymer having a tensile strength of 1775 p.s.i. and an elongation at break of 500% and a 300% modulus of 850 p.s.i. was obtained.

EXAMPLE II

To show the effect of time of contact of the polymer solution with the chlorine, tests were made over a period of several months in a semi-commercial plant with two polymer solutions, one of which was held in agitated contact with the chlorine for 1.6 minutes using no time tank and the other for an additional 23.4 minutes in a time tank, and the loss in Mooney of the product over the polymer submitted to chlorination determined in each case. The following data were obtained:

*1.6 Minute Contact Time*

| Weight percent Cl₂ in product | Mooney loss | Weight percent Cl₂ in product | Mooney loss |
|---|---|---|---|
| 1.03 | 13 | 1.14 | 15 |
| 1.04 | 14 | 1.15 | 12 |
| 1.07 | 15 | 1.16 | 18 |
| 1.08 | 11 | 1.16 | 21 |
| 1.08 | 18 | 1.18 | 17 |
| 1.13 | 16 | 1.19 | 22 |
| 1.13 | 14 | 1.25 | 22 |

*25 Minute Contact Time*

| Weight percent Cl₂ in product | Mooney loss | Weight percent Cl₂ in product | Mooney loss |
|---|---|---|---|
| 1.00 | 13 | 1.22 | 18 |
| 1.05 | 17 | 1.23 | 15 |
| 1.13 | 18 | 1.26 | 15 |
| 1.16 | 16 | 1.27 | 21 |
| 1.19 | 16 | 1.27 | 17 |
| 1.19 | 14 | 1.28 | 15 |
| 1.20 | 15 | 1.29 | 16 |
| 1.20 | 17 | 1.34 | 16 |
| 1.22 | 21 | 1.34 | 18 |

Figure 2:
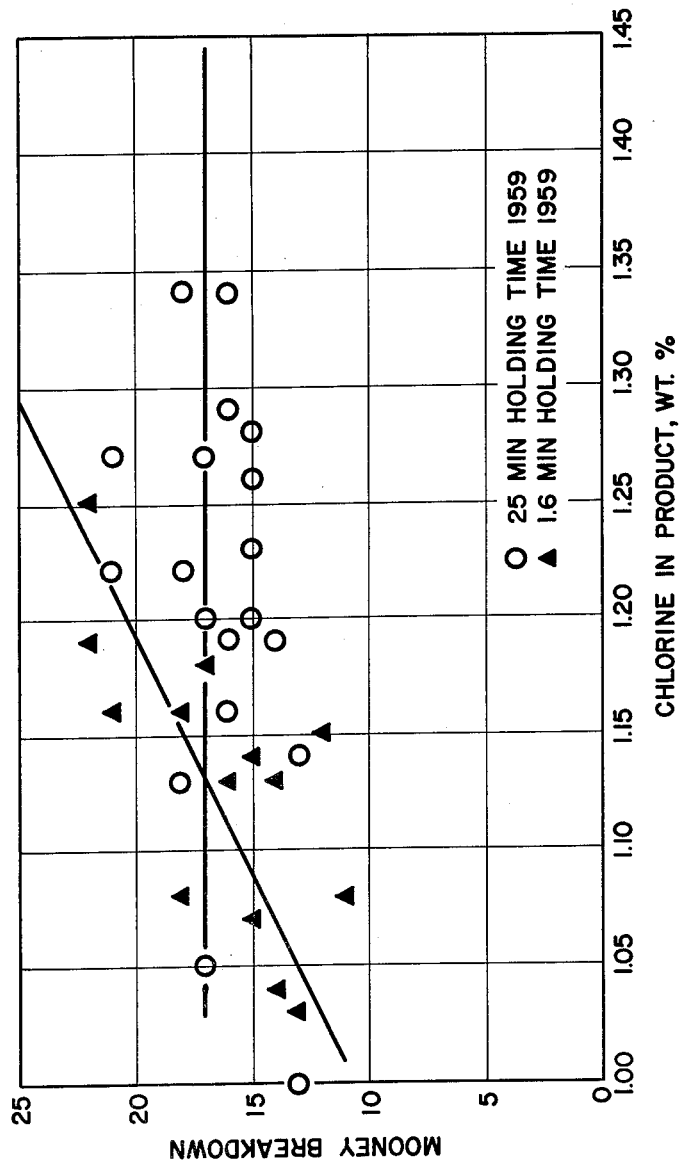

When the above data are plotted as shown in FIG. 2 and the best line drawn as computed by the method of least squares, it is clear that the Mooney breakdown is greater with a short contact time than with a long time using a time tank for a given chlorine content of the polymer.

EXAMPLE III

A chlorinated butyl rubber cement was prepared as described in Example I from a butyl rubber which contained small amounts of zinc stearate such that the chlorinated butyl rubber cement obtained 0.3% zinc stearate. This cement was washed with varying amounts of 10% caustic to determine the degree of settling. The following data were obtained:

| Run No. | Cc. 10% NaOH | pH wash water | Cc. H₂O layer after 1 min. settling |
|---|---|---|---|
| 1 | 3 | 10.6 | 163 |
| 2 | 2 | 7.4 | 130 |
| 3 | 1.5 | 3.5 | 175 |

A similar chlorinated butyl rubber containing no zinc stearate or other soap when washed in the same manner gives the following results:

| Run No. | Cc. 10% NaOH | pH wash water | Cc. H₂O layer after 1 min. settling |
|---|---|---|---|
| 4 | 3 | 11.1 | 190 |
| 5 | 2 | 3.6 | 195 |
| 6 | 1.5 | 2.9 | 195 |

The above data show that chlorinated butyl rubber containing zinc stearate or other metal soap must be washed with just enough caustic to maintain the pH of the wash water at 3–4 in order to secure good settling. A pH of 10–11 is likewise suitable.

The foregoing description does not by any means cover the possible uses of this invention nor the forms it may assume, but serves to illustrate its fundamental principles. It is obvious that changes in the details may be made without departing from either its novel characteristics or the spirit and scope of the invention. For example, other methods of chlorination than that described in the drawing can be employed. One such method comprises spraying the solution of polymer in solvent into an atmosphere of chlorine. Other methods will be readily apparent to those skilled in the art. For example, settlers 13 and 19 may be replaced by centrifugal separators which enable the time for water separation to be materially decreased. Thus, 70% of the water occluded in a particular sample of chlorinated cement containing 23.6% occluded water was removed by centrifuging for one minute at 1600 r.p.m.

The nature of the present invention having been thus fully set forth and specific examples of the same given, what is new and useful and desired to be secured by Letters Patent is:

1. A process for the continuous chlorination of a butyl rubber isoolefin-multiolefin copolymer of 85 to 99.5% of a $C_4$ to $C_7$ isoolefin and 15 to 0.5% of a $C_4$ to $C_{14}$ multiolefin containing small amounts of metal soaps which comprises continuously contacting a solution of butyl rubber, having a concentration between about 1 and about 30% by wt. of butyl rubber, with chlorine gas, maintaining the butyl rubber in contact with the chlorine for a period of time of at least 25 minutes whereby chlorinated butyl rubber and hydrogen chloride are formed, said copolymer containing up to 1 atom of chlorine per double bond in the copolymer, followed by continuously neutralizing the hydrogen chloride accompanying the chlorinated butyl rubber and continuously washing, while dispersing the so treated chlorinated butyl rubber, the neutralized hydrogen chloride from the chlorinated butyl rubber with water while maintaining the wash water, after neutralization, at a pH between about 3 and about 4 then continuously settling the solution of chlorinated butyl rubber from the aqueous phase and withdrawing said solution of chlorinated butyl rubber from the system.

2. A process for the continuous chlorination of a butyl rubber isoolefin-multiolefin copolymer of 85 to 99.5% of a $C_4$ to $C_7$ isoolefin and 15 to 0.5% of a $C_4$ to $C_{14}$ multiolefin containing small amounts of metal soaps which comprises continuously contacting the solution of butyl rubber having a concentration between about 1 and about 30% by wt. of butyl rubber with chlorine gas, maintaining the butyl rubber in contact with the chlorine for a period of time of at least 25 minutes whereby chlorinated butyl rubber and hydrogen chloride are formed, said copolymer containing up to 1 atom of chlorine per double bond in the copolymer, followed by continuously neutralizing the hydrogen chloride accompanying the chlorinated butyl rubber and continuously washing, while dispersing the so treated chlorinated butyl rubber, the neutralized hydrogen chloride from the chlorinated butyl rubber with water, while maintaining the wash water, after neutralization, at a pH between about 10 and about 11 then continuously settling the solution of chlorinated butyl rubber from the aqueous phase and withdrawing said solution of chlorinated butyl rubber from the system.

3. A process for continuous bromination of a butyl rubber isoolefin-multiolefin copolymer of 85 to 99.5% of a $C_4$ to $C_7$ isoolefin and 15 to 0.5% of a $C_4$ to $C_{14}$ multiolefin containing small amounts of metal soaps which comprises continuously contacting a solution of butyl rubber having a concentration between about 1 and about 30% by weight of butyl rubber with liquid bromine, maintaining the butyl rubber in contact with the bromine up to 3 minutes until brominated butyl rubber and hydrogen bromide are formed; followed by continuously neutralizing the hydrogen bromide accompanying the brominated butyl rubber and continuously washing, while dispersing the so treated brominated butyl rubber, the neutralized hydrogen bromide from the brominated butyl rubber with water, while maintaining the wash water, after neutralization, at a pH between about 3 and about 4, and then continuously settling the solution of washed brominated butyl rubber from the aqueous phase, and withdrawing said solution of brominated butyl rubber from the system.

4. A process for the continuous bromination of a butyl rubber of 85 to 99.5% of a $C_4$ to $C_7$ isoolefin and 15 to 0.5% of a $C_4$ to $C_{14}$ isoolefin-multiolefin copolymer containing small amounts of metal soaps which comprises continuously contacting a solution of butyl rubber having a concentration between about 1 and about 30% by weight of butyl rubber with liquid bromine, maintaining the butyl rubber in contact with the bromine up to 3 minutes until brominated butyl rubber and hydrogen bromide are formed, followed by continuously neutralizing the hydrogen bromide accompanying the brominated butyl rubber and continuously washing, while dispersing the so-treated brominated butyl rubber, the neutralized hydrogen bromide from the brominated butyl rubber with water, while maintaining the wash water, after neutralization, at a pH between about 10 and about 11, and then continuously settling the solution of washed brominated butyl rubber from the aqueous phase, and withdrawing said solution of brominated butyl rubber from the system.

5. In a process for halogenating a butyl rubber isoolefin-multiolefin copolymer of 85 to 99.5% of a $C_4$ to $C_7$ isoolefin and 15 to 0.5% of a $C_4$ to $C_{14}$ multiolefin containing a small amount of metal soaps in which a solution of the butyl rubber is contacted with a halogen selected from the group consisting of bromine and chlorine, subsequently washed, while dispersing the so treated halogenatated butyl rubber solution, with a dilute aqueous alkali solution, to neutralize the hydrogen halide, and settled, whereby a polymer phase and an aqueous phase are formed, the improvement which comprises maintaining the aqueous phase after neutralization, at a pH between about 3 and about 4.

6. In a process for halogenating a butyl rubber isoolefin-multiolefin copolymer of 85 to 99.5% of a $C_4$ to $C_7$ isoolefin and 15 to 0.5% of a $C_4$ to $C_{14}$ multiolefin, containing a small amount of metal soaps in which a solution of the butyl rubber is contacted with a halogen selected from the group consisting of bromine and chlorine, subsequently washed, while dispersing the so-treated halogenated butyl rubber solution, with a dilute aqueous alkali solution, to neutralize the hydrogen halide, and settled, whereby a polymer phase and an aqueous phase are formed, the improvement which comprises maintaining the aqueous phase, after neutralization, at a pH between about 10 and about 11.

7. In a process for chlorinating a butyl rubber isoolefin-multiolefin copolymer of 85 to 99.5% of a $C_4$ to $C_7$ isoolefin and 15 to 0.5% of a $C_4$ to $C_{14}$ multiolefin containing small amounts of metal soaps in which a solution of the butyl rubber is contacted with chlorine gas for a time sufficient to introduce up to 1 atom of chlorine per double bond in the copolymer, subsequently washed, while dispersing the so treated halogenated butyl rubber solution, with a dilute aqueous alkali solution, to neutralize the hydrogen chloride, and settled, whereby a polymer phase and an aqueous phase are formed, the improvement which comprises maintaining the aqueous phase, after neutralization, at a pH between about 3 and about 4.

References Cited in the file of this patent

UNITED STATES PATENTS

| | | |
|---|---|---|
| 2,504,065 | Cheyney | Apr. 11, 1950 |
| 2,631,984 | Crawford et al. | Mar. 17, 1953 |
| 2,941,975 | Minckler, et al. | June 21, 1960 |